US011489485B2

(12) United States Patent
Roberts et al.

(10) Patent No.: US 11,489,485 B2
(45) Date of Patent: Nov. 1, 2022

(54) FOLDABLE SOLAR POWER SYSTEM

(71) Applicant: CubeX Solar, LLC, Sebastopol, CA (US)

(72) Inventors: Takia Roberts, Sebastopol, CA (US); William Taylor, Sebastopol, CA (US)

(73) Assignee: CubeX Solar, LLC, Sebastopol, CA (US)

( * ) Notice: Subject to any disclaimer, the term of this patent is extended or adjusted under 35 U.S.C. 154(b) by 0 days.

(21) Appl. No.: 16/742,868

(22) Filed: Jan. 14, 2020

(65) Prior Publication Data

US 2020/0228057 A1 Jul. 16, 2020

Related U.S. Application Data

(60) Provisional application No. 62/793,310, filed on Jan. 16, 2019.

(51) Int. Cl.
*H02S 30/20* (2014.01)
*H02S 40/32* (2014.01)
*H02S 10/40* (2014.01)
*H02S 20/30* (2014.01)

(52) U.S. Cl.
CPC ............... *H02S 30/20* (2014.12); *H02S 10/40* (2014.12); *H02S 20/30* (2014.12); *H02S 40/32* (2014.12)

(58) Field of Classification Search
CPC .......... H02S 30/20; H02S 10/40; H02S 20/30; H02S 40/32
See application file for complete search history.

(56) References Cited

U.S. PATENT DOCUMENTS

| 5,969,501 | A  | * | 10/1999 | Glidden  | H02S 10/40 |
| | | | | | 320/101 |
| 2012/0298201 | A1 | * | 11/2012 | Stephan | H02S 20/30 |
| | | | | | 136/259 |
| 2013/0049342 | A1 | * | 2/2013 | Cottrell | B60P 7/13 |
| | | | | | 280/839 |
| 2015/0162865 | A1 | * | 6/2015 | Cowham | F24S 25/70 |
| | | | | | 136/251 |

(Continued)

OTHER PUBLICATIONS

Trunz water systems, https://web.archive.org/web/20180225030412/http://www.army-technology.com/contractors/wastewater-treatment/tws, downloaded Apr. 7, 2021, pp. 1-8 (Year: 2018).*

(Continued)

*Primary Examiner* — Jayne L Mershon
(74) *Attorney, Agent, or Firm* — Perkins Coie LLP

(57) ABSTRACT

Foldable solar power systems are disclosed herein. In some embodiments, a solar power system includes a support structure mounted to an intermediate bulk container (IBC) or other tank structure. A plurality of solar panels are mounted to the support structure. The support structure is movable between (a) a first configuration for storage and transport and (b) a second configuration for energy generation. In the first configuration, the solar panels are folded adjacent to a sidewall of the IBC. In the second configuration, the solar panels are opened/expanded and generally coplanar with one another. The solar panels can be aligned with a solar energy source in the second configuration to generate electrical energy. The IBC can be filled with a ballast material to anchor the solar panels in the second configuration.

24 Claims, 8 Drawing Sheets

(56) References Cited

U.S. PATENT DOCUMENTS

| | | | |
|---|---|---|---|
| 2015/0236636 A1* | 8/2015 | Sade | F24S 30/428 |
| | | | 136/246 |
| 2016/0285304 A1 | 9/2016 | Stiefel | |
| 2019/0176154 A1* | 6/2019 | Daniels | B01L 3/545 |
| 2020/0165048 A1* | 5/2020 | Weyrauch | B65D 77/0466 |

OTHER PUBLICATIONS

International Searching Authority, International Search Report and Written Opinion, PCT Patent Application PCT/US2020/013575, dated May 14, 2020, 11 pages.

Hartman, F. "Ikube F150 in Lebanon" Youtube; Video [online], May 26, 2018 [retrieved Mar. 2, 2020], Retrieved from the Internet: <URL:https://www.youtube.com/watch?v=6-PQtHy0i_E>; see times 0:35 to 0:47, 1:40 to 1:44.

Thermopan Diffusion, "Ikube Deploie" Youtube; Video [online], Aug. 15, 2012 [retrieved Mar. 2, 2020], Retrieved from the Internet: <URL: https://www.youtube.com/watch?v=GyGWToXz714>; see times 0:42 to 0:59, 1:11 to 2:05.

Trunz Water Systems AG, "Trunz Water Trailer" Youtube; Video [online], Dec. 6, 2007 [retrieved Mar. 2, 2020], Retrieved from the Internet: <URL: https://www.youtube.com/watch?v=na5DpCANEsE>; see times 0:04 to 0:23, 1:27 to 1:52, 2:02 to 2:05, 4:32 to 4:44.

* cited by examiner

FOLDABLE SOLAR POWER SYSTEM

CROSS-REFERENCES TO RELATED APPLICATIONS

This application claims priority to U.S. Provisional Patent Application No. 62/793,310, filed on Jan. 16, 2019, and titled "PORTABLE SOLAR POWER SYSTEM," the disclosure of which is hereby incorporated herein in its entirety by reference.

TECHNICAL FIELD

The present technology is related to foldable solar power systems and, more particularly, to systems including one or more solar panels mounted to an intermediate bulk container (IBC).

BACKGROUND

Solar power is the conversion of sunlight into electricity, either directly using photovoltaics (PV), indirectly using concentrated solar power, or a combination thereof. Photovoltaic cells convert light to an electric current using the photovoltaic effect. The photovoltaic effect was first observed in 1876 when it was proved that light, without heat or moving parts, can be converted into electricity. Beginning in 1953, silicon-based solar cells produced enough electricity to run small electrical devices, e.g. in small electronic, handheld calculators. Significant changes in the size, cost and use of solar cells occurred in the 1970's to the 1990's as conversion efficiency and size improved in solar panels or modules allowing their use at railroad crossings, with remote measuring devices, such as oil and gas wells, and with microwave towers to expand telecommunication capabilities.

As the cost of solar electricity has fallen, the size and number of grid-connected solar PV systems has grown to hundreds of megawatts in a single installation, with millions of systems—from residential to utility-scale solar power stations—operating nationwide. The U.S. installed 2.3 gigawatts (GW) of solar PV capacity in Q2 2018 to reach 58.3 gigawatts (GW) of total installed capacity, enough to power 11 million homes. Total installed U.S. PV capacity is expected to more than double over the next five years, and by 2023, over 14 GW of PV capacity will be installed annually.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1A:
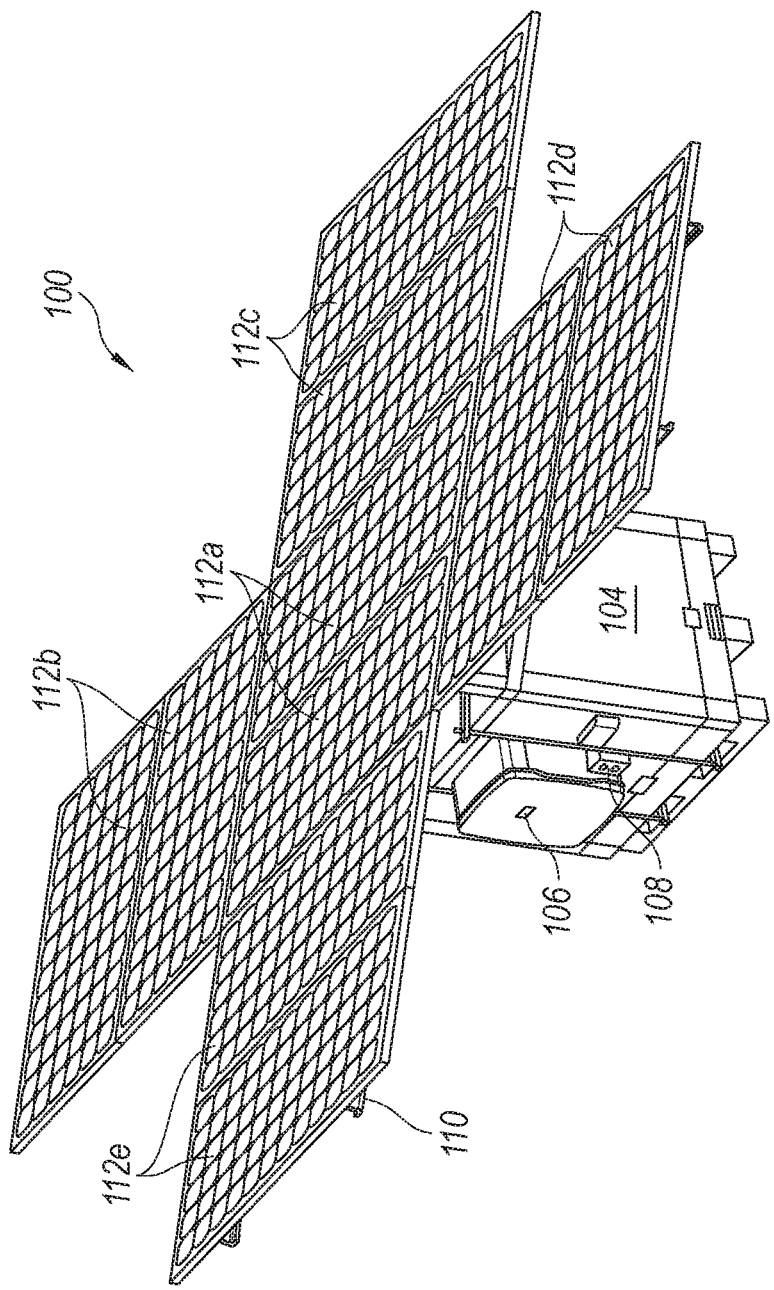
FIGS. 1A and 1B are top and bottom isometric views, respectively, of a solar power system in a deployed mode configured in accordance with an embodiment of the present technology.

The present technology is directed generally directed to foldable solar power systems. In some embodiments, for example, a solar power system includes a support structure mounted to an intermediate bulk container (IBC) or other tank structure. Multiple solar panels are mounted to the support structure. The support structure is movable between (a) a first configuration for storage and transport and (b) a second configuration for energy generation. In the first configuration, the solar panels are folded adjacent to (e.g., generally perpendicular to) a sidewall of the IBC. In the second configuration, the solar panels are opened/unfolded to be generally coplanar with one another. The solar panels can be aligned with or oriented toward a solar energy source (e.g., the sun) in the second configuration to generate electrical energy.

In one aspect of the present technology, the IBC can be filled with a ballast material to anchor the solar power system. In some implementations or embodiments, the IBC can be filled with potable water, fuel, cooking oil, fire retardant, medical fluids (e.g., 5% dextrose, 0.9% NaCl, saline, etc.) and/or other fluids during transportation to a location of need. For example, the IBC can be filled with potable water and delivered to a disaster zone, military facility, field hospital, etc. The IBC can then be drained and the potable water (or other fluid) used. Subsequently, the IBC can be refilled with water, which can then be pressure filtered for potable water, or a ballast material such as sand, waste water, etc., and the solar power system used for energy generation.

Specific details of several embodiments of the present technology are described herein with reference to FIGS. 1A-7. The present technology, however, may be practiced without some of these specific details. In some instances, well-known structures and techniques often associated with solar panels, hinges, intermediate bulk containers, electrical circuitry for converting and/or transmitting power, etc., have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

Figure 1B:
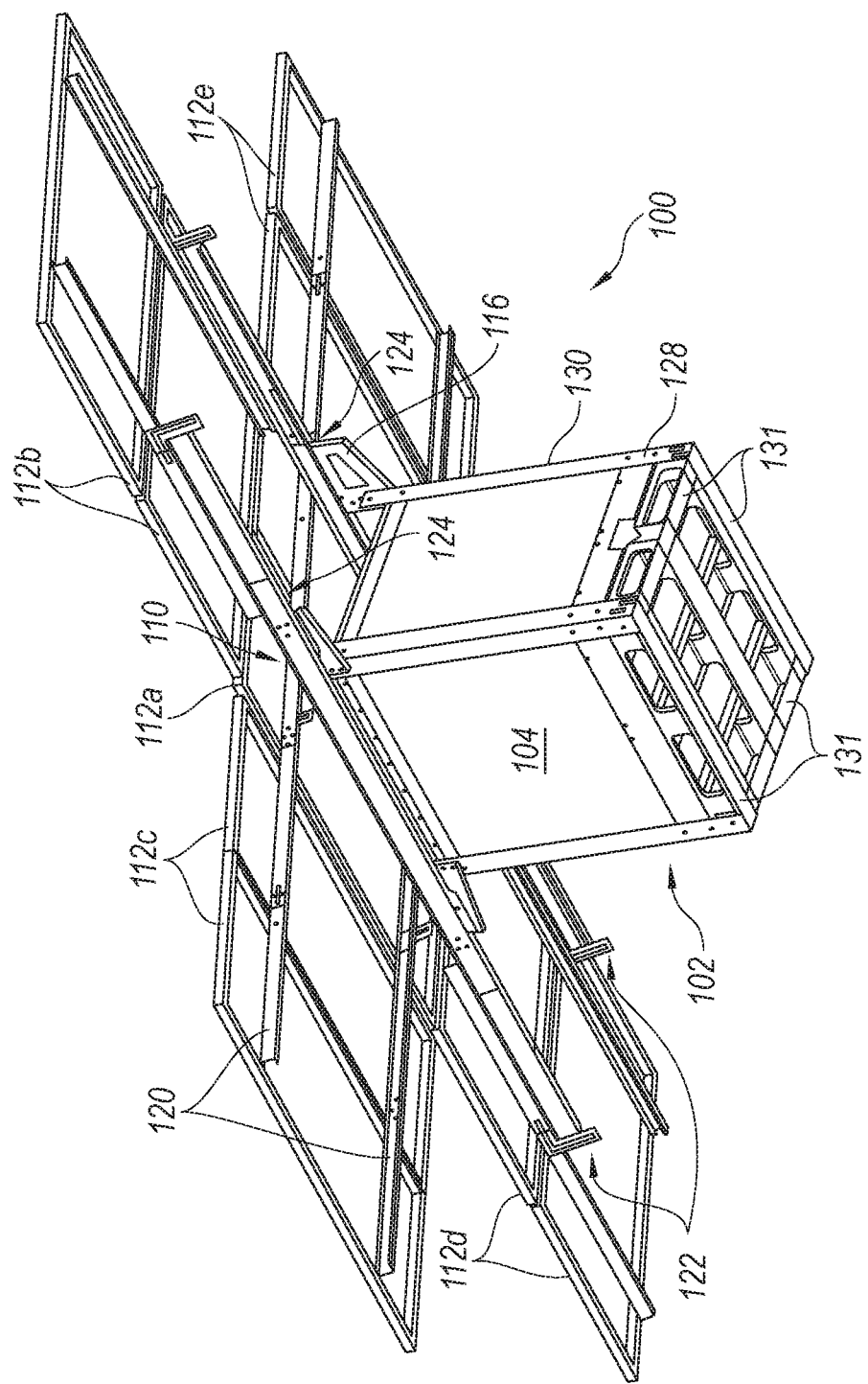
Figure 2:
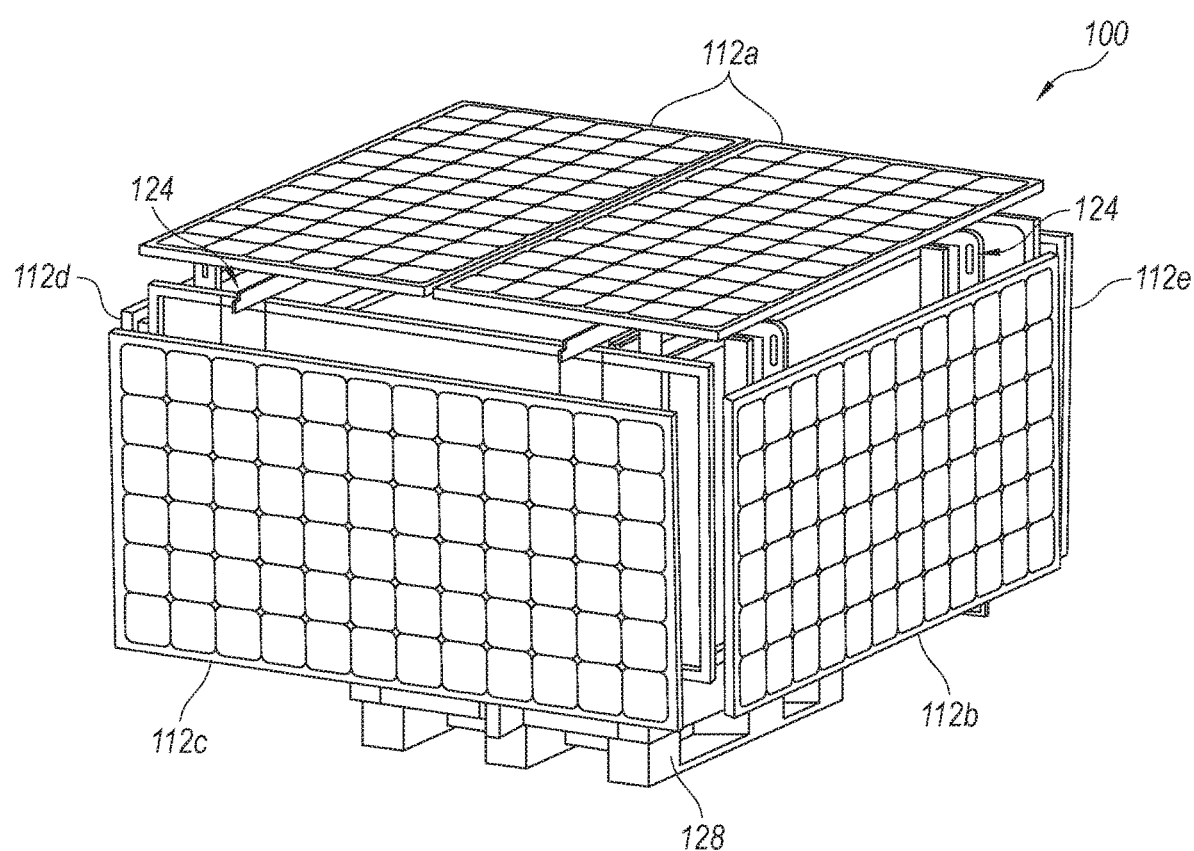
FIG. 2 is an isometric view of the solar power system of FIG. 1 in a stored mode or "cube" configuration configured in accordance with an embodiment of the present technology.
Figure 3:
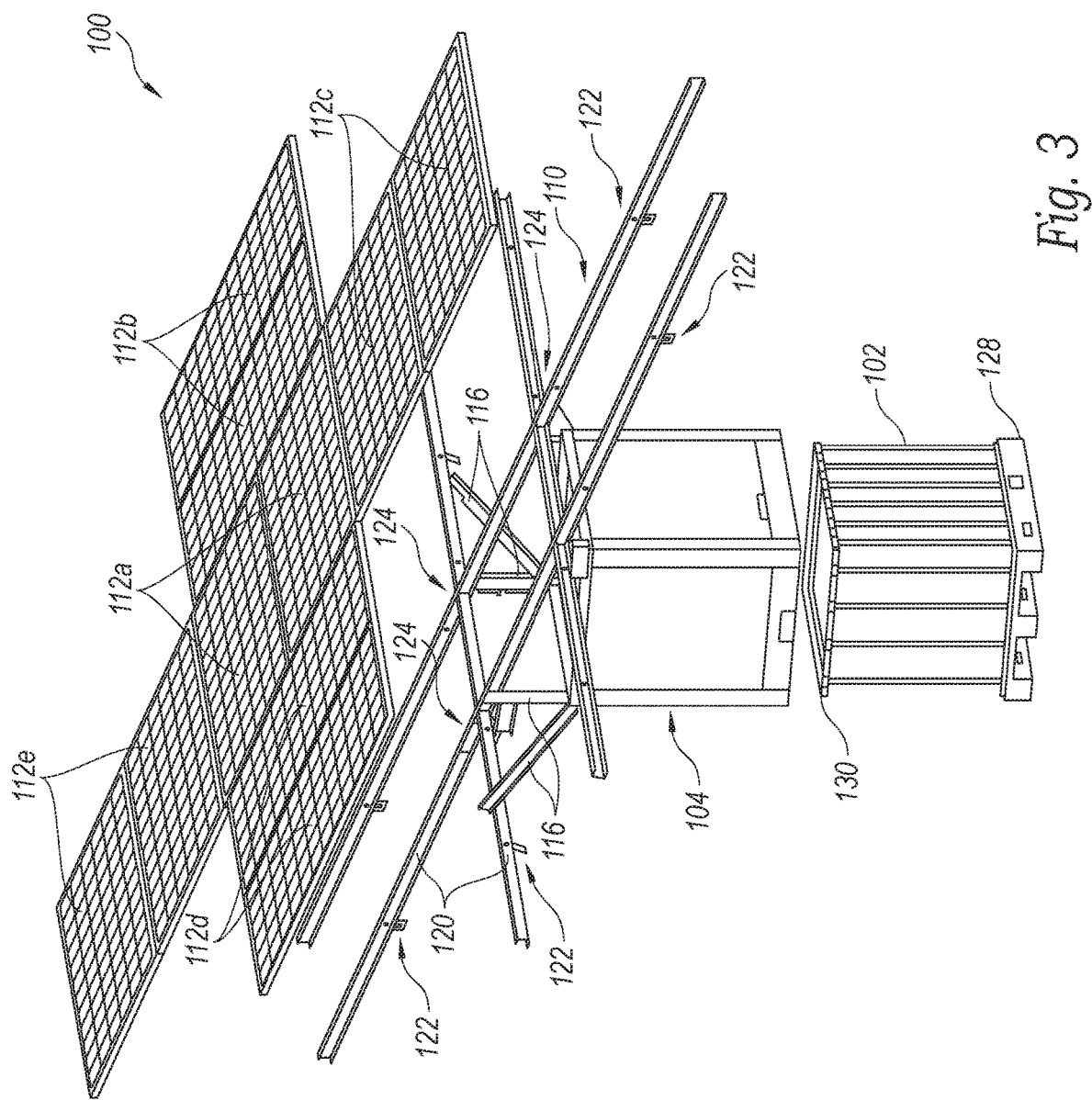
FIG. 3 is an exploded isometric view of the solar power system of FIG. 1 configured in accordance with an embodiment of the present technology.

FIGS. 1A and 1B are top and bottom isometric views, respectively, of a foldable, rapidly deployable, fully operational, foldable solar power system 100 ("solar system 100") configured in accordance with an embodiment of the present technology. The solar system 100 is in a deployed mode/configuration (e.g., fully-deployed mode, an operational mode, etc.) in FIGS. 1A and 1B. FIG. 2 is an isometric view of the solar system 100 in a stored mode/configuration (e.g., "cube" configuration, folded configuration, etc.) configured in accordance with an embodiment of the present technology. FIG. 3 is an exploded isometric view of the solar power system 100 of FIG. 1A.

Referring to FIGS. 1A-3 together, the solar system 100 includes: an intermediate bulk container ("IBC") 102 (see FIG. 3) or, alternatively other types of fluid-filled tanks for ballasting, a rigid steel frame and outer casing 104 surrounding the IBC 102, a side mounted weatherized inverter 106 for immediate attachment to an available electricity point of interconnection, an optional weather-resistant battery system (not shown) for off-grid functionality, a power plug 108 for immediate power, a series of articulating hinges and mounting arms/rails defining a support structure 110 on top of which are mounted multiple (depending on system production size), mono-crystalline, poly-crystalline, or bi-facial solar modules 112 (identified individually as solar modules 112a-112e).

In general, the solar system 100 can be built and/or packaged in the stored mode for handling, shipping, and storage. The solar system 100 can be converted from the stored mode to the deployed mode by extending each of multiple folding articulating hinges, which also allow the deployed solar system 100 to be quickly returned to its stored mode to withstand coming severe weather, repositioning, transport, or storage.

The IBC 102 can be transported empty or full during shipping. The IBC 102 can transport liquids for emergencies, such as potable water, 9% saline, dextrose, cooking oils, kerosene, etc., and then can be refilled with a liquid or other material (e.g., grey water, sand, etc.) as a ballast stabilizer for the deployed solar system 100. Once the storage system 100 is located at an intended destination, the solar modules 112 can be rapidly unfolded to extend to their fully deployed format (FIGS. 1A and 1B) using basic hand or power tools. In some embodiments, the solar system 100 can include a pressure filtration system (not shown) operably coupled to the IBC 102 and configured to filter water and/or other fluids within the IBC 102. For example, the IBC 102 can be filled with waste water, and the pressure filtration system can filter the waste water to produce clean, potable water.

In some instances, a liquid ballast in the IBC 102 can be used while the solar system 100 is on-site. For example, the IBC fluid can be used as a fire suppressant for remote locations with no easy access to water, as construction water for concrete or dust control or a variety of other uses. The solar system 100 can be pre-assembled and pre-wired. Once in position, the articulating hinges of the support structure 110 are extended and tightened, the disclosed technology is placed to maximize solar irradiation, the IBC 102 is filled with a liquid for ballast, the solar modules 112 deployed and connected to, for example, an electrical service. The solar system 100 is then fully operational as an off-grid power source or connected to the electrical service fuse panel and grid-connected with appropriate permitting.

The solar system 100 is capable of producing thousands of watts (kilowatts) of electric power at maximum efficiency, depending on the efficiency of the solar modules 112. The disclosed technology can be connected, linking multiple units together. System efficiency can be enhanced using bi-facial (PERC) modules, which gather additional sunlight from ground reflectivity (such as snow, white gravel, sand or other reflective surfaces) creating greater power density.

More specifically, the solar panels 112a (e.g., a pair of solar panels) are mounted above a top surface of the IBC 102 using the support structure 110, which can be a steel racking system or "hashtag" support structure 110 (e.g. two sets of spaced parallel support arms oriented at 90 degrees to each other). The support structure 110 is attached to the steel frame and casing 104 surrounding the IBC 102. The hashtag support structure 110 can be angled with respect to the top surface of the IBC 102 via steel risers 116 to optimize exposure, which is variable to accommodate solar radiation. In the illustrated embodiment, the support structure 110 is shown tilted by the risers 116 towards the sun. The support structure 110 includes a number of extendable extension struts, rails, or arms 120 that each include hinge mechanisms, such as first hinge mechanism 122 and a second hinge mechanism 124, that allow the arms 120 to fold up against the IBC 102 or to extend outwardly away from the IBC 102.

In the illustrated embodiment, the solar panels 112b-112e are each arranged in pairs and are secured to the arms 120 of the support structure 110 so that they can be extended to be co-planar with the solar panels 112a that are above the top surface of the IBC or folded against the sides of the IBC 102 as will be discussed below. Each pair of folding solar panels 112b-112e around the sides of the IBC 102 are mounted to the arms 120 which pivot by the hinge mechanisms 122, 124 to their full extension. Accordingly, in the deployed position shown in FIGS. 1A and 1B, the solar panels 112 are generally coplanar with one another and extend away from the sidewall of the IBC 102 (and the frame 104 surrounding the IBC 102). In contrast, in the storage position shown in FIG. 2, the solar panels 112 are positioned adjacent to the sidewall of the IBC 102 (e.g., generally perpendicular to the sidewall of the IBC 102) and are not coplanar with one another. In some embodiments, all components of the support structure 110 are powder-coated, galvanized, steel or stainless steel. The folding solar panels 112b-112e can be pivoted outwardly from the IBC 102 and the hinges 122, 124 locked to secure all the solar panels 112 in a manner extending outwardly and directed upward toward the sun.

The folding solar panels 112b-112e can be extended and retracted quickly, and the solar system 100 boxed with plywood, cardboard, canvas, padding, and/or flexible weather-resistant sheeting (not shown) for storage, shipping, and transportation. In some embodiments, the IBC 102 is located on a pallet 128. In the stored-mode (FIG. 2), the disclosed technology can be lifted by fork-lift for conveyance via rail, flatbed trailer or truck, boat, or plane, and positioned at its destination by forklift, by helicopter, by drone, or the like. Accordingly, the solar system 100 can be easily transported. The packaging surrounding the solar power system 100 can be retained for a storm-resistant cover, if needed. This foldable, fully-integrated, operational, mobile solar power system with weather-resistant cover is unique to the market. Once the disclosed technology is deployed, the solar system 100 can quickly and easily be retracted to its "cube" mode (e.g., stored mode) for repositioning, relocation, or as protection against coming inclement weather (tornado, hurricane, ice-storm, snow, superstorms, etc.) using standard hand tools.

The solar system 100 uniquely incorporates an intermediate bulk container (IBC) 102 as ballast for the solar modules 112 that are mounted to the frame 104 surrounding the IBC. The IBC 102 can have various tank capacities. In some embodiments, the IBC 102 can have a standard 275 or 330-gallon tank capacity. Made from blow molded UV-stabilized, high molecular weight, high density chemically resistant polyethylene, Intermediate Bulk Containers are designed for hazardous or sensitive filling goods. IBCs fulfill the requirements of international packaging regulations, incorporate a metal cage 130 designed to meet vibration, shipping and stacking requirements, and a broad spectrum of fillings goods. Various pallet designs 128 are available to meet specific deployment requirements of corrosion resistance, shock, and cleanliness. A permeation barrier can be incorporated for various purposes, including flow-batteries or water filtration systems. In some embodiments, the IBC 102 includes a top fill port, various discharge valves, outlet connections, label plates, and screw caps. Alternatively, a custom tank may be incorporated into the disclosed technology. The IBC 102 is designed for use in Ex-Zones and granted certification for UN approval. The IBC 102 and the disclosed technology are designed to prevent electrostatic charging during service life. IBC provides a recollection and cleaning service, returning the IBC 102 in a food-grade sanitary condition, which the disclosed solar system can accommodate. The IBC 102 may be substituted for another fluid tank. In some embodiments, the fluid tank may alternatively be replaced with a battery (dry cell, NiCad, LIB, flow or wet based) acting as ballast.

The IBC 102 or other fluid tank acts as the ballast for the solar system 100 when full, eliminating the need for ground penetrating anchors, piers, ground screws or "tray and paver" type ballasting. The disclosed technology is freestanding. There is no need for concrete, rebar, or extensive excavation. Tethers and anchors can be added for further stability, or if the fluid tank is drained.

The environmental impact of the disclosed technology is minimal. A stable level surface with access to solar energy is recommended; however, the disclosed solar system 100 can tolerate sloped surfaces and shaded locations with resulting performance variances. The solar system is non-invasive; easily relocated with little or no residual impact or footprint. The system is reusable and recyclable.

Figure 4:
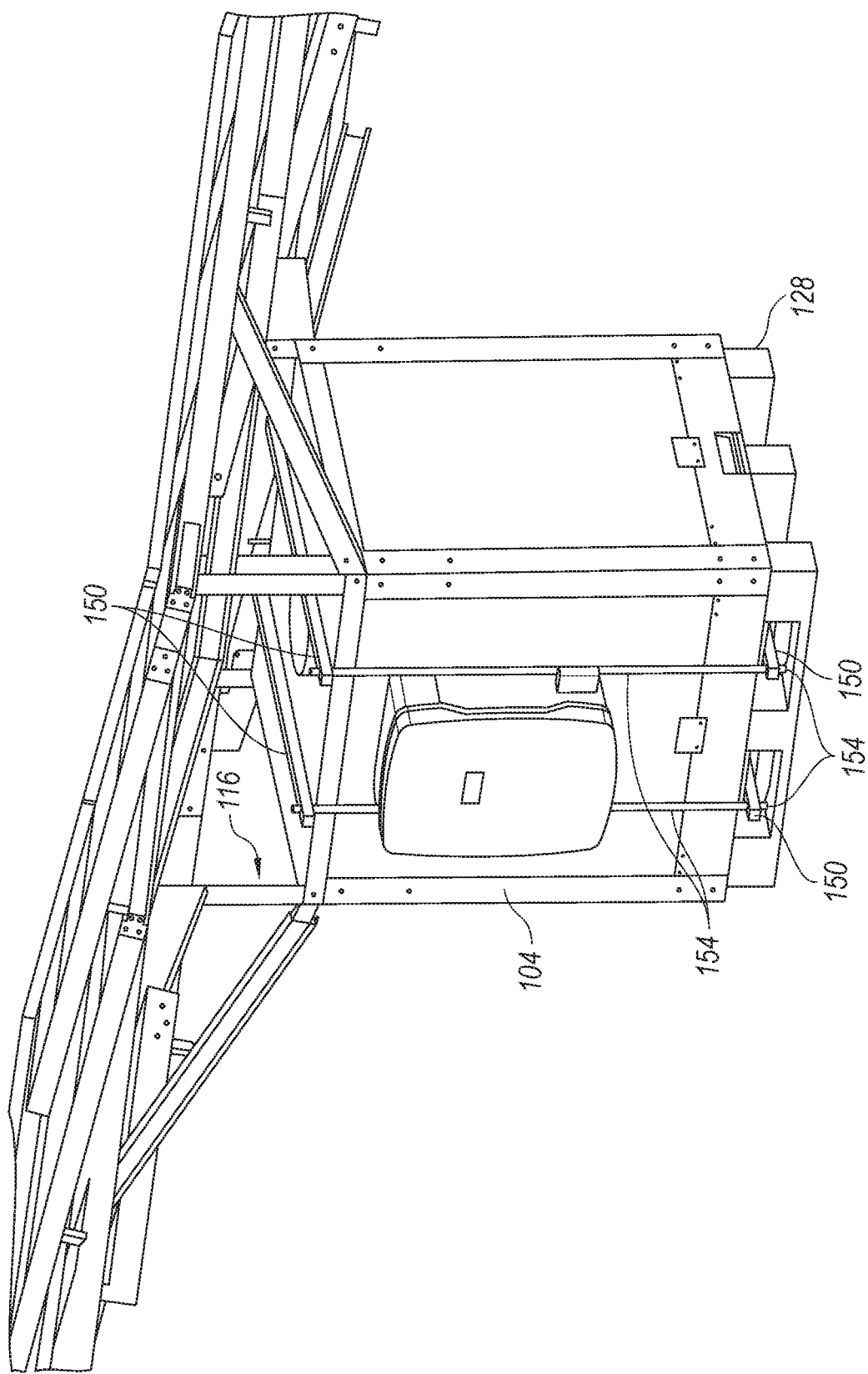
FIG. 4 is a rear isometric view of the solar system 100 of FIG. 1 illustrating additional detail of a technique for securing a casing and solar panels to an IBC and its supporting pallet in accordance with an embodiment of the present technology.

In one embodiment, the fluid tank base or pallet 128 that is below the IBC 102 is enclosed within a metal frame or caging formed of metal framing. In one embodiment, the casing 104 is formed of a number of angle brackets and panels that fit over the IBC 102 and its IBC framing/metal cage 130 and is secured to the IBC 102 with a pair of rack and rod brackets (e.g., via threaded rods and metal brackets as shown in FIGS. 1A and 4). In other embodiments, as shown in FIG. 1B, the metal cage 130 can include a plurality (e.g., four) base plates 131 that secure the metal casing around the pallet 128. The base plates 131 can: (i) permit the metal frame 130 to be secured to IBCs having different heights or other dimensions, (ii) inhibit or even prevent the metal frame 130 from coming off (detaching from) the IBC 102 (e.g., in a similar manner as the threaded rods and metal brackets shown in FIGS. 1A and 4), and (iii) provide a ground path from the solar panels 112 through the support structure 110 and the metal casing 130 to the ground. The ground path provided by the base plates 131 can mitigate the danger of electrical shock to someone deploying or operating the solar system 100.

In some embodiments, the support arms 120 of the hashtag support structure 110 are hinged so that two or more solar panels (e.g., a pair of the solar panels 112b-112e) can be folded and stored adjacent to each side wall of the IBC 102. During setup, the entire set of solar panels 112 can be tilted with respect to the top surface of the IBC 102 to better face the sun. In some embodiments, the support arms 120 include hinges (e.g., the hinges 122, 124) with locking mechanisms that keep the solar panels 112 in either the stowed or deployed positions. The casing 104 provides lateral and vertical stability, provides further UV and weather-protection protection for the IBC 102, and allows for mounting of inverters, batteries, wiring, and/or other components to the solar system 100.

The IBC 102 and its surrounding metal cage 130 rest on the base pallet 128 or other suitable structure that will allow a hand-lift, forklift, or other device to move the foldable solar system 100. Notably, the solar system 100 can be easily transported when folded up and the fluid tank 102 is empty. When the IBC 102 is full, then the IBC 102 acts as a ballast to retain the solar system 100 in the deployed position. Of course, the fluid tank 102 can be filled with potable water and shipped to a location that requires not only electricity but also drinking water. The IBC 102, the solar modules 112, inverters, etc., can all be "off-the-shelf" components.

In some embodiments, the solar system 100 includes a weather resistant inverter 106 with outlets 108 and ports that allow immediate "plug and play" interface to a building, field tent, medical facility, an intact or repaired wiring system, etc., which can allow near time availability of lights, cooking devices, pumps for water, and/or communication systems (e.g., boosters for telecommunications).

As mentioned, the solar system 100 can include an optional weather tolerant battery system. The battery may be housed immediately adjacent to the casing 104 or the battery can be the IBC 102 itself.

In some embodiments, the solar system 100 is constructed mostly of standard hardware components such as the IBC 102, standard or common metric bolts, nuts, locking and star washers, and sheet metal screws. The disclosed technology is specifically designed for durability and ease of deployment and operation, such that it can be delivered quickly, into emergency settings. For example, in the aftermath of a natural or man-made catastrophe (fire, flood, earthquake, war, terrorism, hurricane, typhoon, etc.) the disclosed technology can be returned to a stored-mode ready for re-deployment. The solar system 100 can be airlifted, in the cube position, to remote areas that lack infrastructure.

The solar system 100 can also be deployed to remote locations to provide power for electric vehicle (EV) charging stations, remote water pumps, measuring devices, and/or other devices. The solar system 100 can accommodate multiple inputs for multiple electrical devices.

The disclosed technology requires no specific engineering, ground studies, environmental impact statement, site, or zoning to obtain building permits. The disclosed technology is an appliance, and as such, once UL certified, is a plug and play unit.

The solar system 100 can be a single unit or multiple units linked in parallel to support larger-scale operations such as military facilities, field hospitals, schools, and disaster relief centers. The disclosed technology is robust with an estimated useful life of approximately 20 years or longer. The disclosed technology can be coupled to other electricity production devices, for example, to an existing micro-grid, micro-hydro or wind facility, and/or to a natural gas or diesel generator.

In some embodiments, the solar system 100 provides a user interface device such as a touch screen, which allows a programmed processor of the system to produce power production graphics and controls to allow a user to operate the system. Such a processor can be included in the inverter or can be otherwise provided in a weather-proof case. In some implementations, a display separate from the solar system 100 can be installed to monitor the solar system 100 for energy production and battery life.

In some implementations, the solar system 100 also includes a communication device capable of communicating wirelessly or over a wire-based with a network node. The communication device can communicate with other devices or a server through a network using, for example, TCP/IP, cellular, Wi-Fi, USB, or other protocols. The disclosed technology can utilize the communication device to distribute operations across multiple solar systems, interrelate power production modalities, and/or to operate security lights or cameras.

The disclosed technology can be operational with numerous other general purpose or special purpose electricity-generating system environments or configurations. Examples include: grid-hardening for existing grid instability, micro-hydro or micro-wind systems, generators, or existing solar systems.

The disclosed technology can be used on a ranch, farm, or at a residence where the installation of solar on a rooftop is impractical (shading, slope, orientation, etc.) or the ground inhospitable (wet, clay, topography, stony, etc.) making installation impossible, impractical, or cost-prohibitive.

The solar system 100 is anticipated to cost far less than conventional solar systems of similar capability because there is significantly reduced installation and construction labor, and other soft costs, such as design, blueprints, engineering, soil analysis, permitting and permit approval and inspection, archeological, title, or land surveys. The solar system 100 can be easily retracted, folded, re-packaged (if necessary) and relocated.

FIG. 4 is a rear isometric view of the solar system 100 of FIG. 1 illustrating additional detail of a technique for securing the casing 104 and the solar panels 112 to the IBC 102 and its supporting pallet 128 in accordance with an embodiment of the present technology. In the illustrated embodiment, pairs of metal brackets 150 are positioned on top of the casing 104 and under a portion of the pallet 128. The brackets 150 are joined together with a number of threaded rods 154. Nuts on the rods 154 are tightened to pull the brackets 150 together and secure the casing 104 to the pallet 128.

Figure 5:
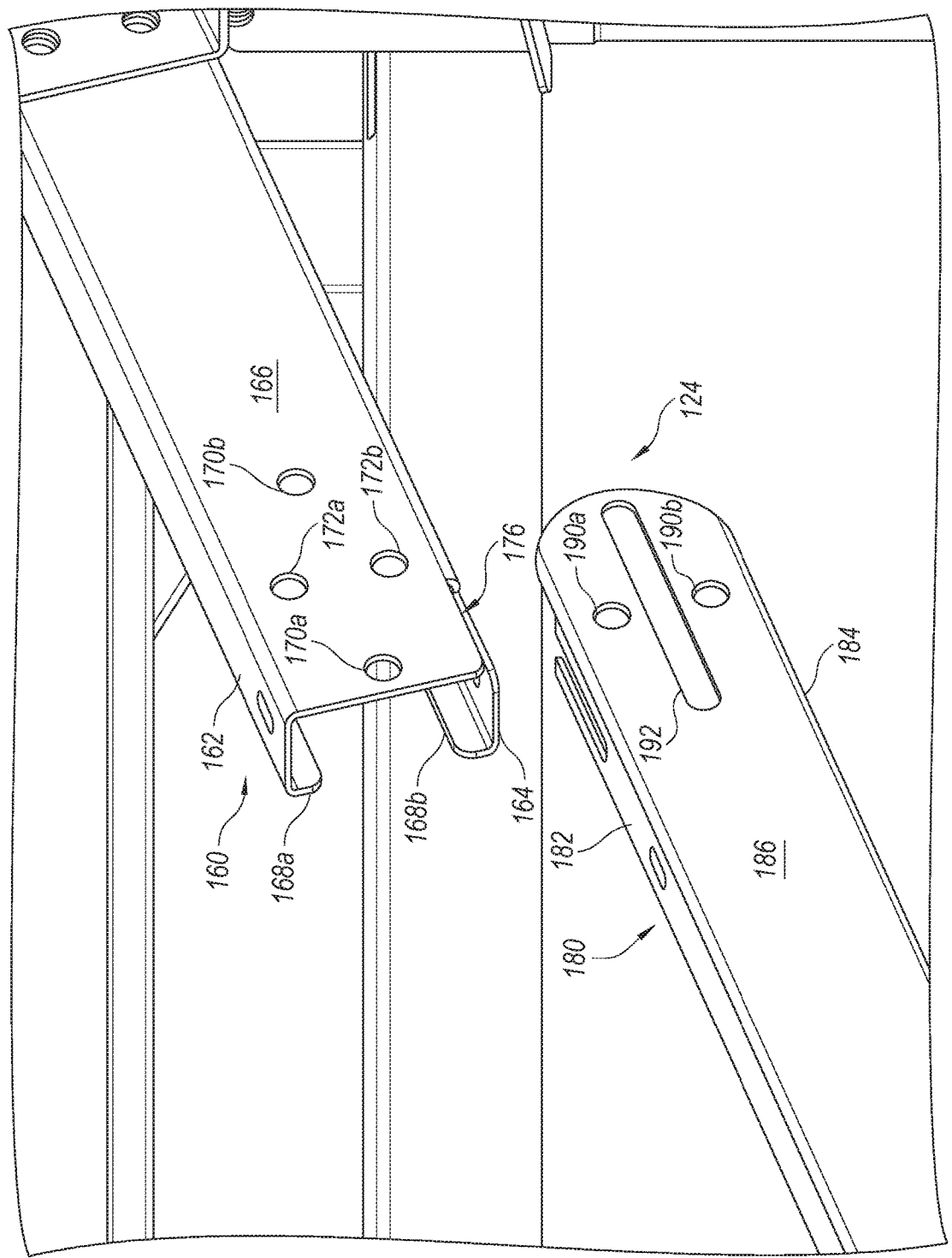
FIG. 5 is an enlarged view of a 90-degree hinge mechanism for folding a solar panel configured in accordance with an embodiment of the present technology.
Figure 6:
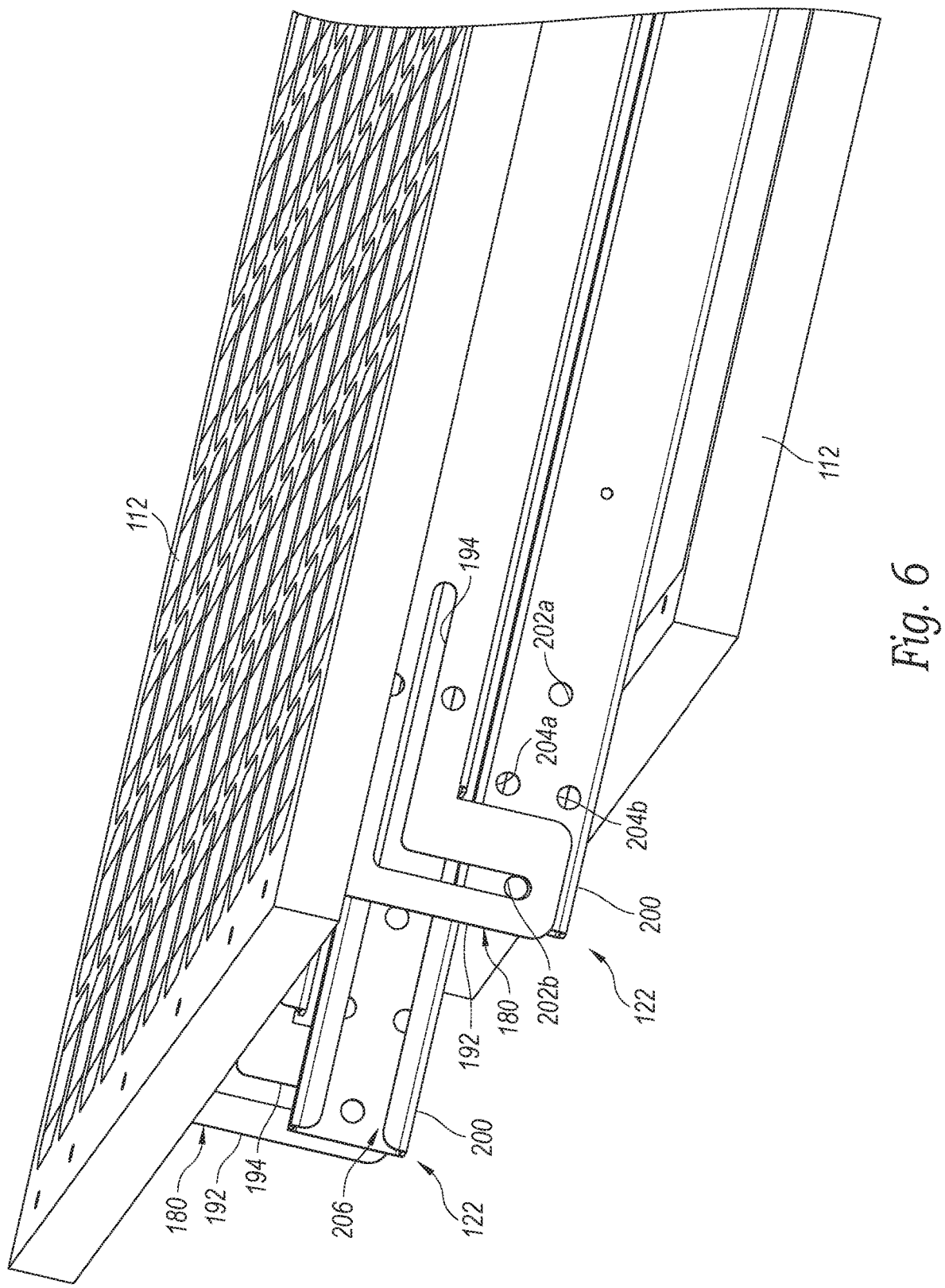
FIG. 6 is an enlarged view of a 180-degree hinge mechanism for folding a solar panel configured in accordance with an embodiment of the present technology.

FIG. 5 is an enlarged isometric view of one of the second hinges 124 and a portion of the arms 120 of the solar system 100 configured in accordance with an embodiment of the present technology. FIG. 6 is an enlarged isometric view of two of the first hinges 122 of the solar system 100 and a portion of the arms 120 and a pair of the solar panels 112 configured in accordance with an embodiment of the present technology. Referring to FIGS. 1-3, 5, and 6 together, the hinges 122, 124 allow the arms 120 to extend the solar panels 112 away from the IBC 102 during use or to fold up against the sides of the IBC 102 for storage or transport. In some embodiments, for example, (i) the first hinges 122 are a first style of hinge that allows one of each pair of the solar panels 112b-112e (e.g., an outer one of the pair positioned farther from the IBC 102) to move/rotate through a generally 180-degree angle relative to the other one of the pair (e.g., an inner one of the pair positioned nearer to the IBC 102), and (ii) the second hinges 124 are a second style of hinge that allows each pair of the solar panels 112b-112e to move/rotate through a generally 90-degree angle relative to, for example, the solar panels 112a (e.g., the top of the IBC 102). In some embodiments, the arms 120 are made of rectangular metal channels where the dimensions of one channel are slightly larger than the dimensions of an adjacent channel to allow a portion of the smaller channel to slide within the end of the larger channel. In one embodiment, the channels are open on one side.

Referring to FIG. 5, a first channel 160 includes a shorter top surface 162 and a bottom surface 164 that are joined by a longer first side surface 166. In one embodiment, the other side surface includes a pair of lips 168a, 168b extending from the top and bottom surfaces respectively such that a portion of the second side surface is open. The side surface 166 includes a number of holes therein through which fasteners (not shown) can be inserted to join the two channels together. In one embodiment the holes include two horizontally aligned holes 170a, 170b and two vertically aligned holes 172a, 172b. In addition, the corner of the channel where the side surface 166 meets the bottom surface 164 includes a slot 176 that allows two partially nested channels to rotate (e.g., 90 degrees) with respect to each other.

A second channel 180 is also rectangular in cross-section with dimensions that are smaller than the first channel 160. The second channel 180 includes a top surface 182, a bottom surface 184 and a first side surface 186. A second side surface includes two lips extending from the top and bottom surfaces respectively (not shown) such a portion of the second side surface is open. The first side surface 186 includes two vertically aligned holes 190a, 190b and a horizontally extending slot 192 positioned between the two holes 190a, 190b. The holes 190a, 190b are positioned to align with the holes 172a, 172b of the first channel 160 when the end of the second channel 180 is inserted into the open end of the first channel 160. In addition, the slot 192 is aligned with the horizontal holes 170a, 170b. The end of the side surface 186 is rounded and extends past the end of the top and bottom surfaces 182, 184. Loosely placing a fastener in the hole 170a and the slot 192 allows the second channel 180 to be slid in and out of the first channel 160 and to rotate 90 degrees with respect to the first channel such that the end of the channel fits within the slot 176. When a fastener is placed in the hole 170b and the slot 192, the second channel is locked inside the first channel 160. Fasteners in the holes 172a, 172b serve to further lock the position of the second channel 180 with respect to the first channel 160.

The second hinge 124 created by the hole 170a and the slot 192, allows the solar panels secured to the arm 180 to drop 90 degrees with respect to the top of the IBC as can be seen in FIG. 2. To raise or extend the solar panels, the second channel 180 is rotated and slid into the end of the first channel 160 and is secured with suitable fasteners such as with rivets, bolts, washers, and/or locking nuts.

FIG. 6 shows additional detail of the first hinge 122 at the other end of the second channel 180. As shown, the second channel 180 includes a L-shaped tab 192 having a corresponding L-shaped slot 194 that extends in a direction perpendicular to the length of the channel 180 and in a direction aligned with the length of the channel. A third channel piece 200 includes two horizontally aligned holes 202a, 202b and two vertically aligned holes 204a, 204b at an end of the channel. A slot 206 between the bottom surface of the channel 200 and a side surface of the channel piece 200 allows the L-shaped tab 192 of the channel 180 to slide into the channel 200. In one embodiment, a hinge mechanism formed by a fastener (not shown) in the hole 202b and the L-shaped slot 194 allows the third channel piece 200 to be rotated 180 degrees with respect to the second channel 180. A pair of solar panels attached to the third channel 200 can therefore be folded 180 degrees with respect to a pair of solar panels on the channel 180.

To extend the solar panels, the channel 200 is rotated such that the holes 202a, 202b are aligned with the portion of the slot 194 that is in line with the length of the channel 180 and the end of the channel 200 fits over the end of the channel 180. The two channels 180, 200 are secured together by placing fasteners through the holes 202a, 202b and the slot 194 and through the holes 204a, 204b and corresponding holes in the channel 180.

In the illustrated embodiment, the end of the channel 200 fits over the end of the channel 180. As will be appreciated, the first hinge 122 can also be dimensioned such that the end of the channel 180 fits over the end of the channel 200. In the embodiments shown, a portion of the channels are nested or telescope together and are secured with fasteners such as bolts/nuts that can easily be assembled with hand tools in the field.

Those skilled in the art will appreciate that the components illustrated in FIGS. 1A-6 described above, and in each of the Figures discussed, may be altered in a variety of ways. In the embodiments shown, the number of solar panels supported by the frame are symmetric with respect to the center IBC and the material forming the ballast. In other embodiments, the layout of the solar panels need not be symmetric. For example, a solar power system configured in accordance with the present technology can include 6, 7, 8, 9, 10, 11, 12, 13, 14 or more solar panels arranged symmetrically or asymmetrically. In addition, in the embodiment shown, the support arms contain two sets of solar panels that can be folded against the sides of the IBC. In some embodiments with lessor power requirements, a single set of solar panels on each side can be used, thereby eliminating the need for the 180-degree hinges at the end of the arms.

Figure 7:
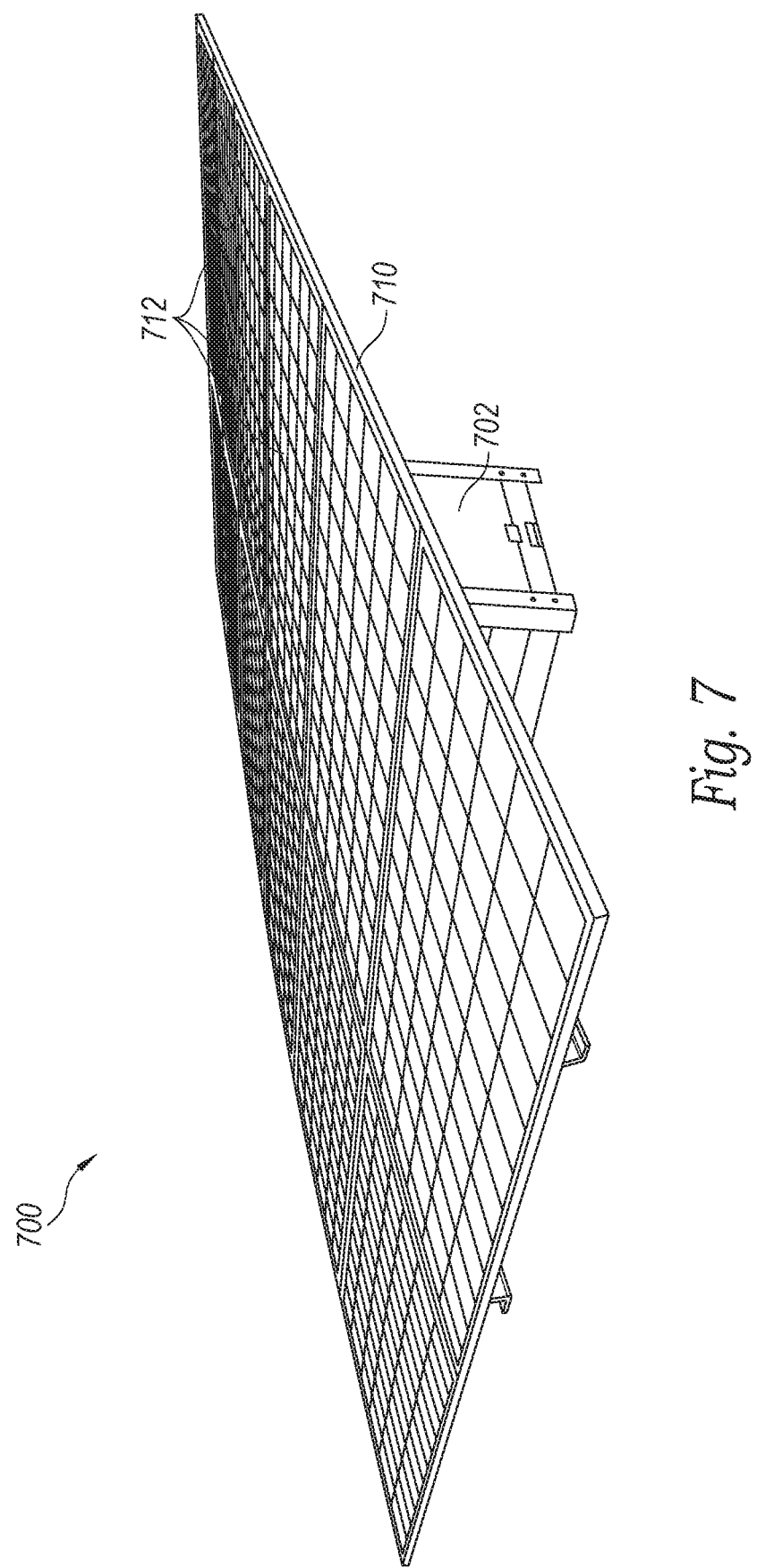
FIG. 7 is an isometric view of a solar power system in a deployed mode configured in accordance with another embodiment of the present technology.

More specifically, for example, FIG. 7 is a perspective view of a foldable solar power system 700 ("solar system 700") configured in accordance with another embodiment of the present technology. The solar system 700 is in a deployed mode/configuration (e.g., fully-deployed mode, an operational mode, etc.) in FIG. 7. The solar system 700 can have features generally similar to or identical to those of the solar system 100 described in detail above with reference to FIGS. 1-6. For example, the solar system 700 includes an intermediate bulk container ("IBC") 702, a series of articulating hinges and mounting arms/rails defining a support structure 710, and a plurality of solar modules 712 mounted to the support structure 710.

In the illustrated embodiment, the solar system 700 includes twelve solar panels 712 arranged in six pairs. In some embodiments, the outermost pairs of the solar panels 712 (e.g., relative to the IBC 702) can be folded 180 degrees relative to the adjacent pair of solar panels 712. The adjacent pairs of solar panels 712 can then be folded 90 degrees relative to the IBC 702 (and/or relative two innermost pairs of the solar panels 712 mounted to the IBC 702) to move the solar system 700 to a stored configuration.

The disclosed technology provides near-term access to electricity. The solar panels collect solar energy, convert that energy to electricity and deliver that electricity, in hours, even minutes (certainly not months, as evidenced by the recent disaster in Puerto Rico) after arrival at its intended location. The module array is pre-assembled, pre-wired and pre-packaged for easy shipping and delivery. The disclosed technology is self-ballasting, providing a source for emergency liquids for human consumption or disaster assistance, fully integrated to an inverter, with an option for stand-alone off-girid use when coupled with a battery.

Several implementations of the disclosed technology are described above in reference to the Figures. The described technology may be implemented using one or more units, battery, and micro-grid or other grid interfaces. Various communications links can be used, such as the Internet, a local area network, a wide area network.

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A solar power system, comprising:
   an intermediate bulk container (IBC) having a pallet, a tank, and a rigid frame,
      wherein the frame surrounds the tank and secures the pallet to the tank, and
      wherein the IBC further has a sidewall and a top surface;
   a rigid casing surrounding the frame and secured to the IBC;
   a support structure mounted to the casing; and multiple solar panels mounted to the support structure,
wherein the support structure is movable between (a) a storage configuration in which the solar panels are positioned generally adjacent to the sidewall of the IBC and (b) a deployed configuration in which the solar panels are positioned away from the sidewall of the IBC, and
wherein the IBC is configured to be filled with a ballast material to anchor the support structure and the solar panels.

2. The solar power system of claim 1 wherein, in the deployed configuration, the solar panels are (a) generally coplanar with one another and (b) angled relative to the top surface of the IBC.

3. The solar power system of claim 1 wherein the support structure includes multiple arms, wherein individual ones of the arms (a) include a hinge and (b) are pivotable at least about 90 degrees about the hinge to move a corresponding one or more of the solar panels between the storage configuration and the deployed configuration, and wherein the hinge is a first hinge, and wherein individual ones of the arms (a) further include a second hinge and (b) are pivotable about the second hinge to rotate a first one of the solar panels mounted to the arm at least about 180 degrees relative to a second one of the solar panels mounted to the arm.

4. The solar power system of claim 1 wherein the support structure includes multiple arms, wherein individual ones of the arms (a) include a hinge and (b) are pivotable at least about 90 degrees about the hinge to move a corresponding one or more of the solar panels between the storage configuration and the deployed configuration.

5. The solar power system of claim 1 wherein the support structure includes multiple arms, wherein individual ones of the arms include nesting channels configured to (a) telescope together in the deployed configuration and (b) hinge together in the storage position, and wherein the support structure includes a plurality of arms, wherein a portion of individual ones of the arms includes an L-shaped tab with a corresponding L-shaped slot therein configured to permit two adjacent arm channels to rotate 180 degrees with respect to one another.

6. The solar power system of claim 1 wherein the support structure includes multiple arms, wherein individual ones of the arms include nesting channels configured to (a) telescope together in the deployed configuration and (b) hinge together in the storage position.

7. The solar power system of claim 1 wherein the multiple solar panels include ten solar panels.

8. The solar power system of claim 1 wherein the solar panels are symmetrically arranged.

9. The solar power system of claim 1 wherein the pallet includes channels configured to receive forks from a forklift device.

10. The solar power system of claim 1 wherein, in the storage configuration, the support structure and the solar panels have a generally cubic shape.

11. The solar power system of claim 1 wherein the solar panels include first solar panels and second solar panels, wherein the first solar panels are movable between the storage configuration and the deployed configuration, and wherein the second solar panels are securely mounted above the top surface of the IBC, and wherein the sidewall of the IBC includes four side surfaces, wherein the second solar panels are grouped into four pairs of second solar panels, and wherein each pair of second solar panels is positioned adjacent a corresponding one of the side surfaces in the storage configuration.

12. The solar power system of claim 1 wherein the solar panels include first solar panels and second solar panels, wherein the first solar panels are movable between the storage configuration and the deployed configuration, and wherein the second solar panels are securely mounted above the top surface of the IBC.

13. The solar power system of claim 1, further comprising:
an inverter electrically coupled to the solar panels; and
an electrical outlet mounted to the IBC and electrically coupled to the inverter, wherein the electrical outlet is configured to supply electrical energy to an electrical device coupled thereto.

14. A solar power system, comprising:
a container including
a tank having a top surface;
a pallet; and
a rigid frame that surrounds the tank and secures the pallet to the tank;
a rigid casing surrounding the frame and secured to the container;
a support structure mounted to the container, wherein the support structure includes a plurality of arms; and
a plurality of solar panels mounted to corresponding ones of the arms,
wherein the arms are movable to move the solar panels between (a) a storage position in which the solar panels are positioned generally perpendicular to the top surface of the IBC and (b) a deployed position in which the solar panels are positioned generally coplanar to one another,
wherein the tank is configured to be filled with a ballast material, and
wherein the tank is shaped and sized to anchor the support structure and the solar panels when the tank is filled with the ballast material.

15. The solar power system of claim 14 wherein individual ones of the arms include a first hinge and a second hinge, and wherein individual ones of the arms are pivotable 90 degrees about the first hinge and 180 degrees about the second hinge.

16. The solar power system of claim 14 wherein the plurality of solar panels further includes at least one solar panel securely mounted above the top surface of the tank in both the storage position and the deployed position.

17. The system of claim 14 wherein the support structure is mounted to the frame.

18. The system of claim 17 wherein the tank has a wall enclosing a volume configured to be filled with the ballast material, and wherein the frame and the wall each have a cubic shape.

19. The system of claim 14 wherein the container is an intermediate bulk container (IBC).

20. A method of deploying a solar power system, the method comprising:
filling a tank of a container of the solar power system with a ballast material,
wherein the container further includes a pallet and a rigid frame, and
wherein the frame surrounds the tank and secures the pallet to the tank; and
moving a support structure of the solar power system from a storage configuration to a deployed configuration,
wherein the support structure is mounted to a rigid casing that surrounds the frame and is secured to the container;

wherein multiple solar panels are mounted to the support structure, wherein, in the storage configuration, the solar panels are positioned generally adjacent to a sidewall of the tank, and wherein, in the deployed configuration, the solar panels are positioned away from the sidewall of the tank.

21. The method of claim 20 wherein the method further comprises, before filling the tank with the ballast material, draining a transport material from the tank that is different than the ballast material, and wherein the transport material is at least one of a fuel, saline solution, or potable water.

22. The method of claim 20 wherein the method further comprises, before filling the tank with the ballast material, draining a transport material from the tank that is different than the ballast material.

23. The method of claim 20 wherein the solar panels are generally coplanar in the deployed configuration, and wherein the method further comprises aligning the solar panels with the sun after moving the support structure to the deployed configuration.

24. The method of claim 20 wherein the container is an intermediate bulk container (IBC).

\* \* \* \* \*